US010920766B2

(12) United States Patent
Mou et al.

(10) Patent No.: US 10,920,766 B2
(45) Date of Patent: Feb. 16, 2021

(54) FLUID SYSTEM

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW); Hsuan-Kai Chen, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 223 days.

(21) Appl. No.: 16/223,900

(22) Filed: Dec. 18, 2018

(65) Prior Publication Data

US 2019/0226471 A1   Jul. 25, 2019

(30) Foreign Application Priority Data

Jan. 22, 2018  (TW) .............................. 107102255 A

(51) Int. Cl.
*F16K 31/02* (2006.01)
*F04B 43/04* (2006.01)
(Continued)

(52) U.S. Cl.
CPC ...... *F04B 43/046* (2013.01); *B01L 3/502738* (2013.01); *F16K 99/0005* (2013.01);
(Continued)

(58) Field of Classification Search
CPC .... F04B 43/046; F04B 45/047; F16K 31/005; F16K 99/0015; F16K 2099/0094; B41J 2/161
See application file for complete search history.

(56) References Cited

U.S. PATENT DOCUMENTS 5,757,400 A    5/1998 Hoisington
7,524,024 B2 * 4/2009 Murata ................ B41J 2/14233
                                                      347/50
(Continued)

FOREIGN PATENT DOCUMENTS

CN    1399070 A    2/2003
CN    2580141 Y    10/2003
(Continued)

OTHER PUBLICATIONS

Extended European Search Report, dated Feb. 1, 2019, for European Application No. 19150329.1.

*Primary Examiner* — Reinaldo Sanchez-Medina
(74) *Attorney, Agent, or Firm* — Birch, Stewart, Kolasch & Birch, LLP

(57) ABSTRACT

A fluid system is disclosed and includes a fluid active region, a fluid channel, a convergence chamber, plural valves and plural sensors. The fluid active region includes a fluid-guiding unit for transporting fluid and discharging the fluid through an outlet aperture. The fluid channel is in communication with the outlet aperture and includes plural branch channels. The fluid discharged from the fluid active region is split by the branch channels, so that a required amount of the fluid to be transported is achieved. The convergence chamber is in communication with the fluid channel for allowing the fluid to be accumulated therein. Each valve is disposed in the corresponding branch channel. The fluid is discharged out through the corresponding branch channel according to an open/closed state of the valve disposed therein. Each sensor is disposed in the corresponding branch channel for measuring a specific detecting content in the fluid.

18 Claims, 13 Drawing Sheets

(51) Int. Cl.
*F16K 99/00* (2006.01)
*B01L 3/00* (2006.01)

(52) U.S. Cl.
CPC ...... *F16K 99/0015* (2013.01); *F16K 99/0055* (2013.01); *B01L 2200/12* (2013.01); *B01L 2300/0663* (2013.01); *B01L 2300/0887* (2013.01); *B01L 2300/123* (2013.01); *B01L 2400/0439* (2013.01); *B01L 2400/0655* (2013.01)

(56) References Cited

U.S. PATENT DOCUMENTS

| | | | |
|---|---|---|---|
| 9,482,221 | B2 | 11/2016 | Kamitani et al. |
| 2002/0098122 | A1 | 6/2002 | Singh et al. |
| 2007/0166199 | A1* | 7/2007 | Zhou ........................ G01N 1/28 422/400 |
| 2009/0268548 | A1* | 10/2009 | Hartmann ............ B01F 5/0646 366/173.1 |
| 2010/0166585 | A1* | 7/2010 | Reichenbach ........ F04B 43/043 417/509 |
| 2011/0127459 | A1* | 6/2011 | Takahashi ........... F16K 99/0048 251/333 |
| 2013/0333564 | A1* | 12/2013 | Shelnutt ................ F04B 19/006 95/90 |
| 2014/0061517 | A1* | 3/2014 | Maier ................ G05D 16/2026 251/65 |
| 2014/0093431 | A1 | 4/2014 | Zhou et al. |
| 2014/0286795 | A1 | 9/2014 | Kamitani et al. |
| 2015/0060012 | A1 | 3/2015 | Kamitani et al. |
| 2017/0122298 | A1* | 5/2017 | Asai .................... F16K 99/0005 |

FOREIGN PATENT DOCUMENTS

| | | |
|---|---|---|
| CN | 100375837 C | 3/2008 |
| CN | 201475347 U | 5/2010 |
| EP | 1589336 A1 | 10/2005 |
| WO | WO 2010/097740 A1 | 9/2010 |

\* cited by examiner

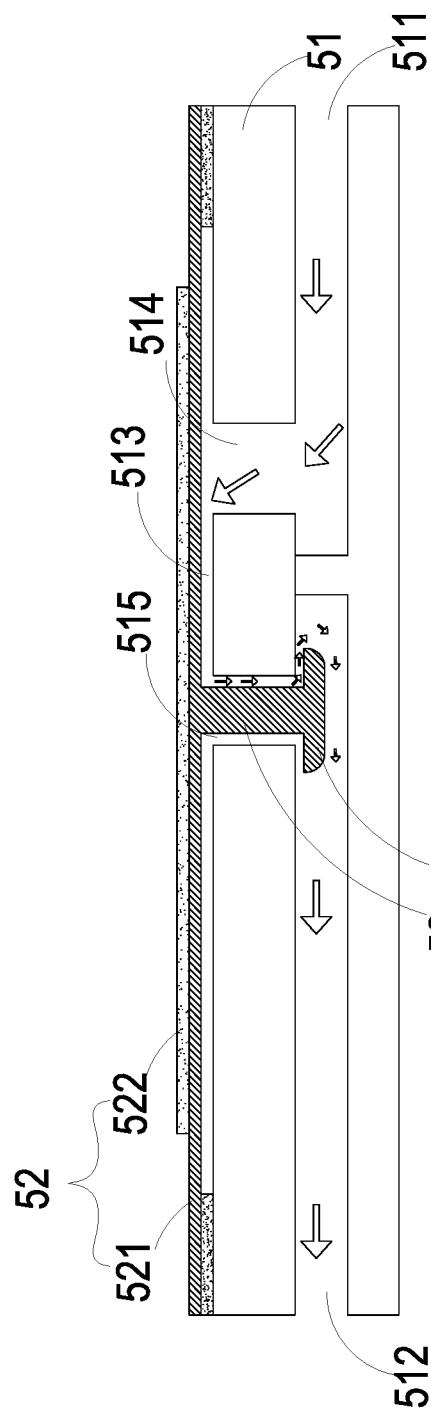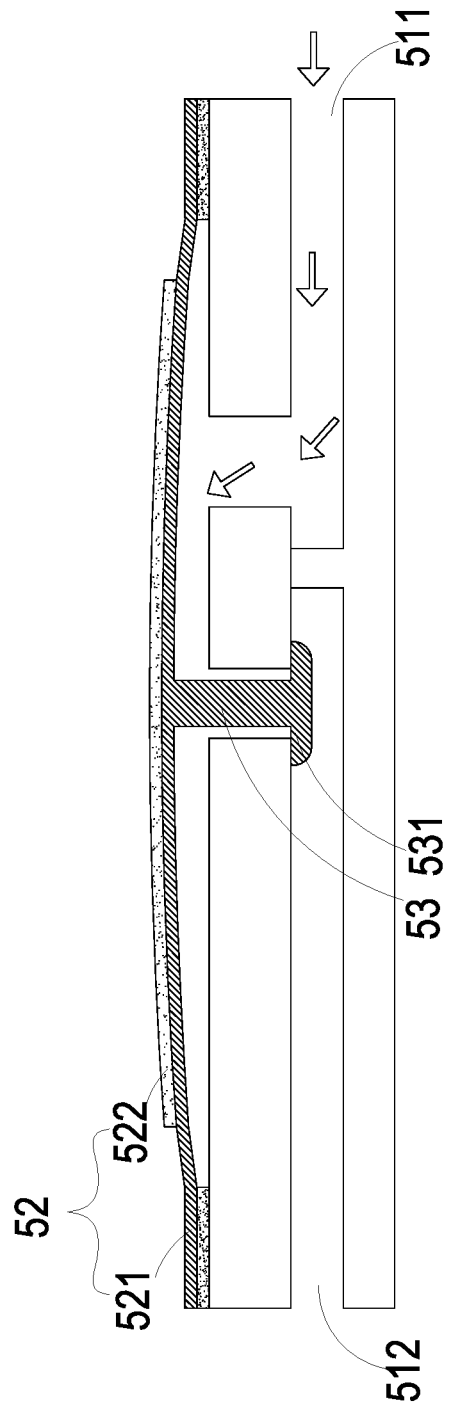
FIG. 6A
FIG. 6B

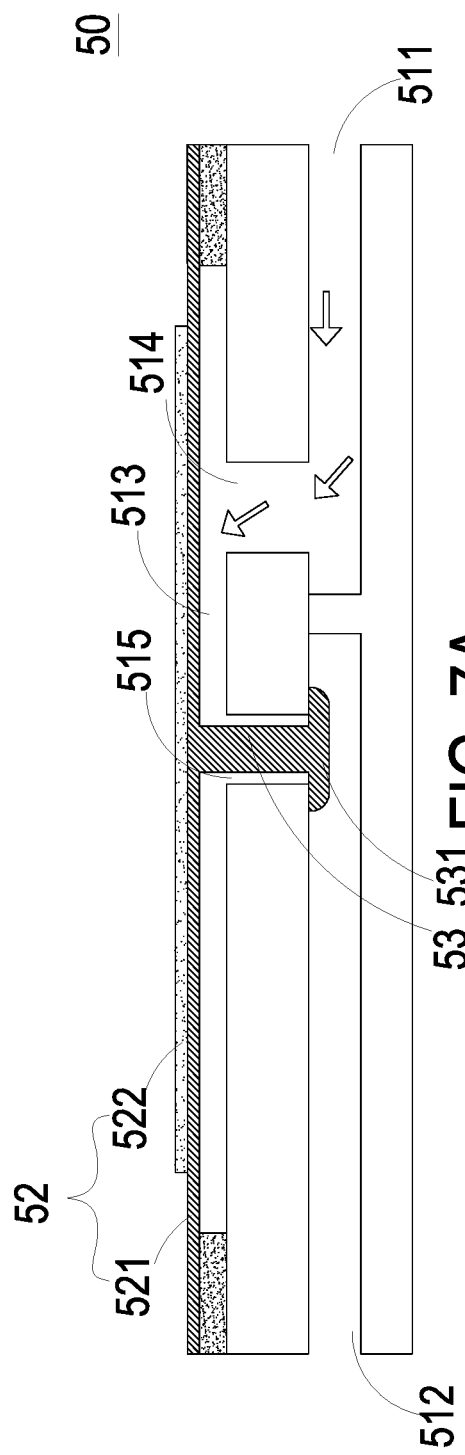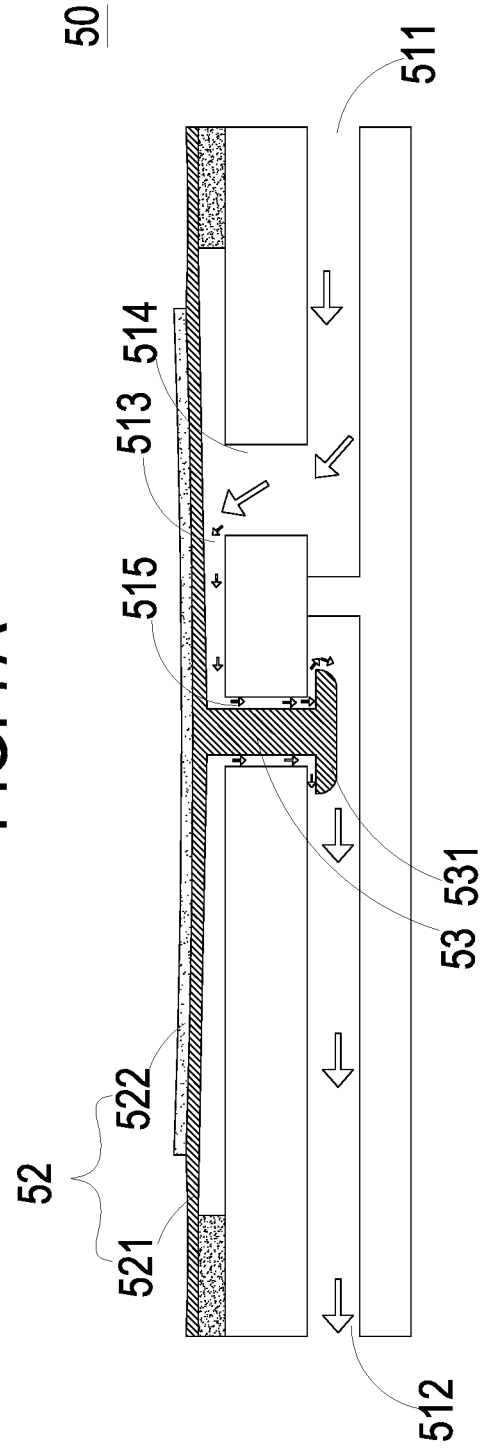
FIG. 7A
FIG. 7B

FLUID SYSTEM

FIELD OF THE INVENTION

The present disclosure relates to a fluid system, and more particularly to a miniature fluid system produced by an integrated process and having a detection function.

BACKGROUND OF THE INVENTION

Nowadays, in various fields such as pharmaceutical industries, computer techniques, printing industries or energy industries, the products are developed toward elaboration and miniaturization. The fluid transportation devices are important components that are used in, for example micro pumps, micro atomizers, print heads or industrial printers. Therefore, how to utilize an innovative structure to break through the bottleneck of the prior art has become an important part of development.

With the rapid development of science and technology, the applications of fluid transportation devices are becoming more and more diversified. For example, fluid transportation devices are gradually popular in industrial applications, biomedical applications, medical care applications, electronic cooling applications and so on, or even the most popular wearable devices. It is obvious that the fluid transportation devices gradually tend to miniaturize the structure and maximize the flow rate thereof.

Although the miniature fluid transportation device is capable of transferring gas continuously, there are still some drawbacks. For example, since the chamber or fluid channel of the miniature fluid transportation device has limited capacity, it is difficult to transfer a great amount of gas. For solving the above drawbacks, it is important to provide a gas transportation device with a valve to control the continuation or interruption of the gas transportation, control the gas to flow in one direction, accumulate the gas in the limited-capacity chamber or fluid channel and increase the amount of the gas to be discharged. In addition, for the miniature fluid transportation device applied to the biomedicine and medical treatment, it is necessary to clearly know the composition of the internal fluid. Therefore, it is necessary to combine the miniature fluid transportation device and the sensor, which is another main subject of the present disclosure.

SUMMARY OF THE INVENTION

An object of the present invention is to provide a fluid system produced by an integrated process to address the issues that the prior arts cannot meet the requirements of the miniature fluid system. The fluid system includes a fluid active region, a fluid channel, a convergence chamber, a plurality of valves and a plurality of sensors. The fluid active region includes at least one fluid-guiding unit, wherein the at least one fluid-guiding unit is configured to transport fluid to flow and discharge the fluid through at least one outlet aperture. The fluid channel is in communication with the at least one outlet aperture of the fluid active region, and comprises a plurality of branch channels, wherein the fluid discharged from the fluid active region is split by the branch channels, so that a required amount of the fluid to be transported is achieved. The convergence chamber is in communication with the fluid channel for allowing the fluid to be accumulated therein. Each valve is disposed in the corresponding branch channel, wherein the fluid is discharged out through the corresponding branch channel according to an open/closed state of the valve disposed therein. Each sensor is disposed in the corresponding branch channel and configured to measure a specific detecting content in the fluid.

In an embodiment, the fluid system further includes a controller. Each of the valves is an active valve, and the controller is electrically connected to the valves to control the open/closed states of the valves. The controller and the at least one fluid-guiding unit are packaged in a system-in-package manner as an integrated structure. The fluid active region includes a plurality of fluid-guiding units. The plurality of fluid-guiding units are connected with each other in a serial arrangement, in a parallel arrangement or in a serial and parallel arrangement. The lengths and widths of the plurality of branch channels are preset according to the required amount or the flow rate of the fluid to be transported. The branch channels are connected with each other in a serial arrangement, in a parallel arrangement or in a serial and parallel arrangement.

From the above descriptions, the fluid system of the present disclosure has miniature volume and is capable of acquiring required flow rate, pressure and amount of the fluid to be transported.

The above contents of the present disclosure will become more readily apparent to those ordinarily skilled in the art after reviewing the following detailed description and accompanying drawings, in which:

BRIEF DESCRIPTION OF THE DRAWINGS

FIGS. 6A and 6B are schematic cross-sectional views illustrating the actions of the valve used in the fluid system according to a first aspect of the embodiment of the present disclosure; and FIGS. 7A and 7B are schematic cross-sectional views illustrating the actions of the valve used in the fluid system according to a second aspect of the embodiment of the present disclosure.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
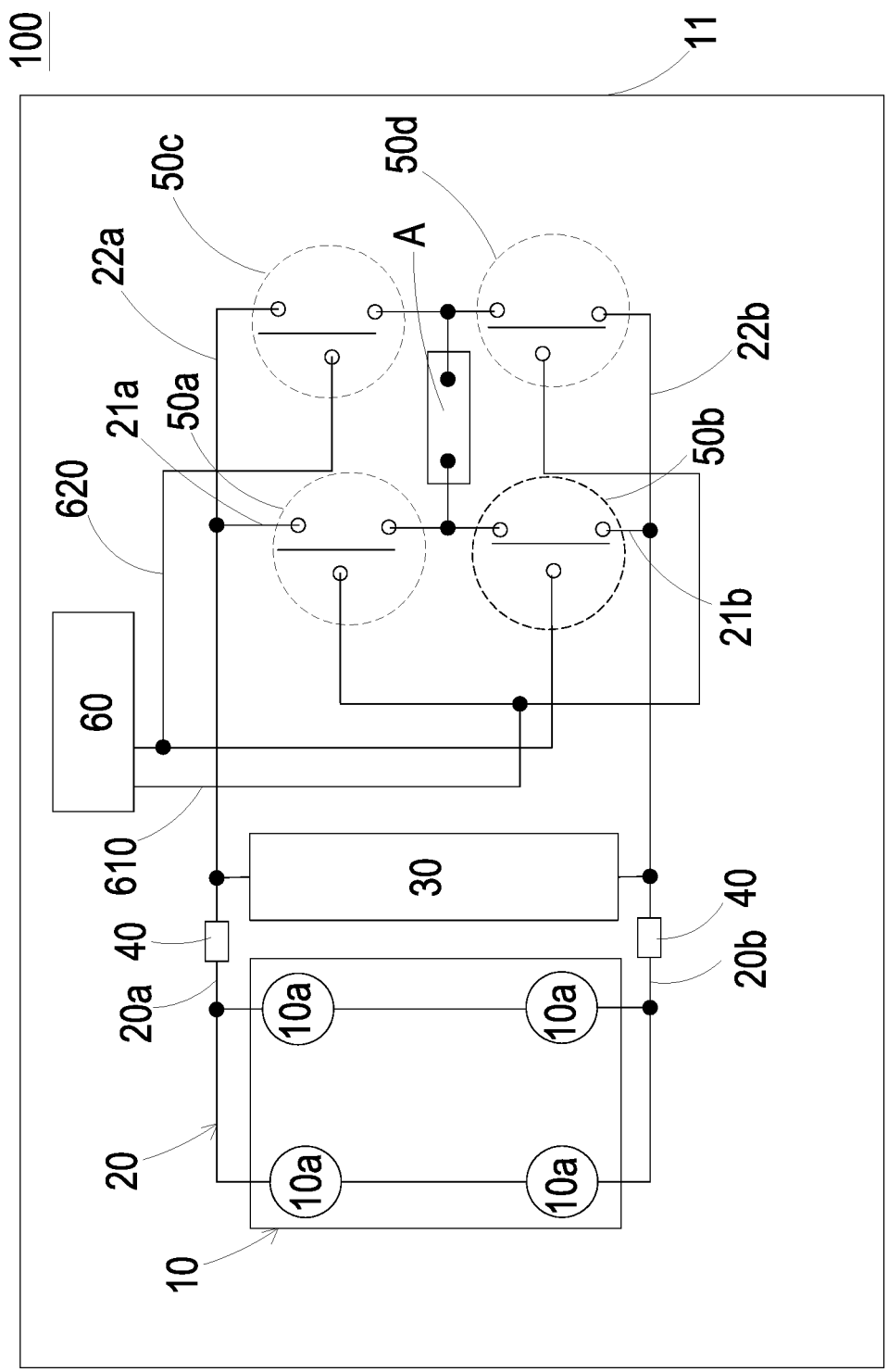
FIG. 1 schematically illustrates a fluid system according to an embodiment of the present disclosure.

Please refer to FIG. 1. The present discourse provides a fluid system 100 including at least one fluid active region 10, at least one fluid channel 20, at least one convergence chamber 30, a plurality of sensors 40, a plurality of valves 50a, 50b, 50c and 50d, at least one fluid-guiding unit 10a, a plurality of branch channels 20a and 20b and at least one specific detecting content. The numbers of the fluid active region 10, the fluid channel 20, the convergence chamber 30 and the specific detecting content are exemplified by one for each in the following embodiments but not limited thereto. It should be noted that each of the fluid active region 10, the fluid channel 20, the convergence chamber 30 and the specific detecting content can also be provided in plural numbers.

Please refer to FIG. 1, which schematically illustrates a fluid system according to an embodiment of the present disclosure. The fluid system 100 includes a fluid active region 10, a fluid channel 20, a convergence chamber 30, a plurality of sensors 40, a plurality of valves 50a, 50b, 50c and 50d, and a controller 60. In this embodiment, the above components are packaged in a system-in-package manner on a substrate 11, so that a miniature integrated structure is formed. The fluid active region 10 includes one or a plurality of fluid-guiding units 10a. The plurality of fluid-guiding units 10a are connected with each other in a serial arrangement, in a parallel arrangement or in a serial and parallel arrangement. When each fluid-guiding unit 10a is enabled, a pressure difference within the fluid-guiding unit 10a is generated, by which fluid (e.g., gas) is inhaled into the fluid-guiding unit 10a and pressurized to be discharged out through an outlet aperture 160 of the fluid-guiding unit 10a (referring to FIG. 2A). Consequently, the fluid is transported through the fluid-guiding unit 10a.

In this embodiment, the fluid active region 10 includes four fluid-guiding units 10a. The four fluid-guiding units 10a are connected with each other in a serial and parallel arrangement. The fluid channel 20 is in fluid communication with the outlet apertures 160 of the fluid-guiding units 10a to receive the fluid discharged from the fluid-guiding units 10a. The structures, actions and dispositions of the fluid-guiding unit 10a and the fluid channel 20 will be described as follows. The fluid channel 20 includes a plurality of branch channels 20a and 20b to split the fluid discharged from the fluid active region 10. Consequently, the required amount of the fluid to be transported is achieved. The branch channels 20a and 20b are exemplified in the above embodiment, but the number of the branch channels is not restricted. The plurality of sensors are disposed in the plurality of branch channels, respectively. In this embodiment, each of the branch channels 20a and 20b includes at least one sensor 40. In other embodiment, each of the branch channels 20a and 20b includes the plurality of sensors 40, but not limited thereto. Each sensor 40 is configured to measure a specific detecting content in the fluid flowing in the branch channels 20a and 20b. The convergence chamber 30 is in communication with the branch channels 20a and 20b, and thus the convergence chamber 30 is in communication with the fluid channel 20. The fluid is transferred to the convergence chamber 30 to be accumulated and stored in the convergence chamber 30. When the fluid system 100 is under control to discharge the required amount of the fluid, the convergence chamber 30 can supply the fluid to the fluid channel 20 so as to increase the amount of the fluid to be transported.

As mentioned above, the fluid channel 20 includes the plurality of branch channels 20a and 20b. As shown in FIG. 1, the branch channels 20a and 20b are connected with each other in a parallel arrangement, but not limited thereto. In some other embodiments, the branch channels 20a and 20b are connected with each other in a serial arrangement or in a serial and parallel arrangement. The lengths and widths of the branch channels 20a and 20b are preset according to the required amount of the fluid to be transported. In other words, the flow rate and amount of the fluid to be transported are influenced by the lengths and widths of the branch channels 20a and 20b. That is, the lengths and widths of the branch channels 20a and 20b may be calculated in advance according to the required amount of the fluid to be transported.

In this embodiment, the branch channel 20a further includes two sub-branch channels 21a and 22a (also referred as branch channels), and the branch channel 20b further includes two sub-branch channels 21b and 22b (also referred as branch channels). The sub-branch channels 21a and 22a of the branch channel 20a are connected with each other in a serial arrangement, in a parallel arrangement or in a serial and parallel arrangement. Similarly, the sub-branch channels 21b and 22b of the branch channel 20b are connected with each other in a serial arrangement, in a parallel arrangement or in a serial and parallel arrangement. The valves 50a, 50c, 50b and 50d may be active valves or passive valves. In this embodiment, the valves 50a, 50c, 50b and 50d are active valves, and the valves 50a, 50c, 50b and 50d are disposed in the sub-branch channels 21a, 22a, 21b and 22b, respectively. The valves 50a, 50c, 50b and 50d are selectively in an open state or a closed state to control the fluid communication state of the corresponding sub-branch channels 21a, 22a, 21b and 22b. For instance, when the valve 50a is in the open state, the sub-branch channel 21a is unobstructed to discharge the fluid to an output region A. When the valve 50b is in the open state, the sub-branch channel 21b is unobstructed to discharge the fluid to the output region A. When the valve 50c is in the open state, the sub-branch channel 22a is unobstructed to discharge the fluid to the output region A. When the valve 50d is in the open state, the sub-branch channel 22b is unobstructed to discharge the fluid to the output region A. The controller 60 includes two conductive wires 610 and 620. The conductive wire 610 is electrically connected with the control terminals of the valves 50a and 50d, and the conductive wire 620 is electrically connected with the control terminals of the valves 50b and 50c. Consequently, the open/closed states of the valves 50a, 50c, 50b and 50d can be controlled by the controller 60, so that the fluid communication states of the corresponding sub-branch channels 21a, 22a, 21b and 22b are controlled by the controller 60 for allowing the fluid to be selectively transported to the output region A.

Moreover, in this embodiment, the plurality of sensors 40 can include a gas sensor or a liquid sensor. In an embodiment, the plurality of sensors 40 can include at least one selected from the group consisting of an ozone sensor, a suspended particle sensor, a volatile organic compound sensor, a light sensor, an oxygen sensor, a carbon monoxide sensor, a carbon dioxide sensor and combinations thereof. Alternatively, the plurality of sensors 40 include at least one selected from the group consisting of a thermometer, a hygrometer and a combination thereof.

Figure 2A:
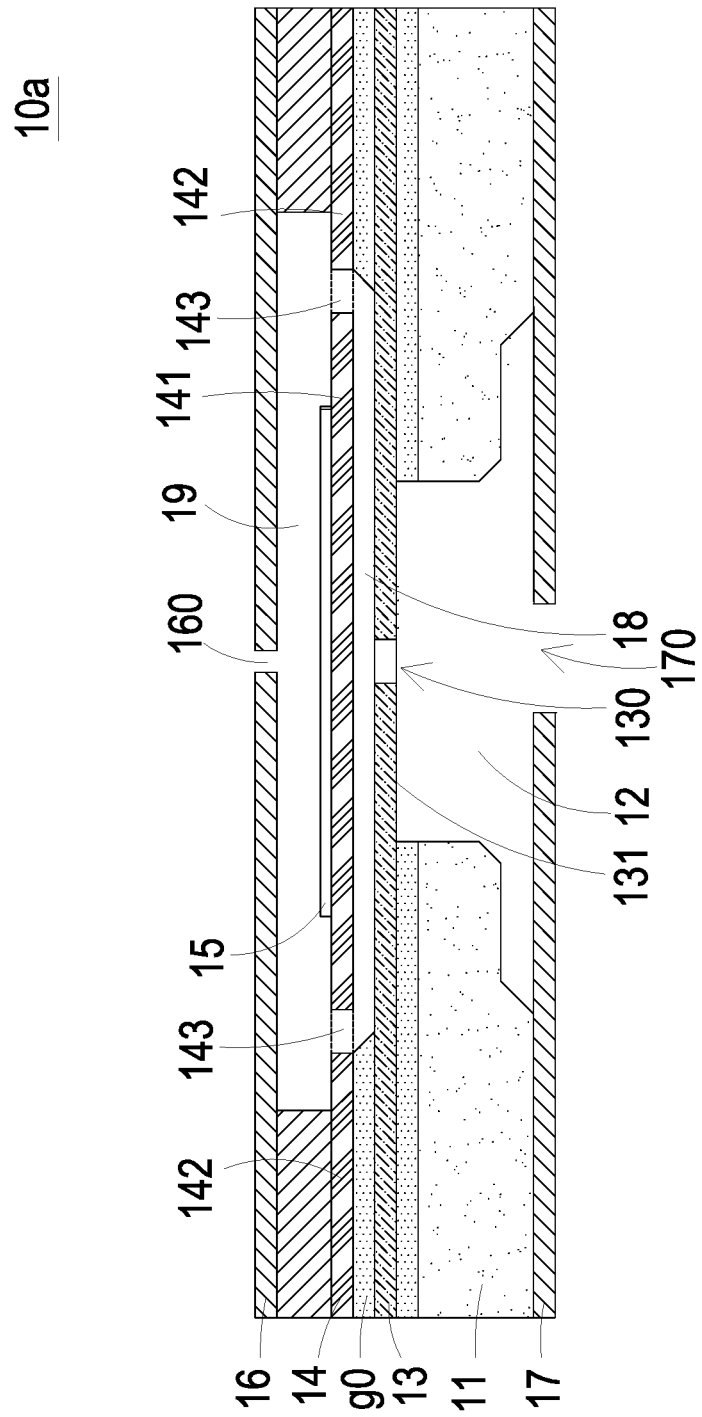
FIG. 2A is a schematic cross-sectional view illustrating a fluid-guiding unit of the fluid system according to the embodiment of the present disclosure.

FIG. 2A is a schematic cross-sectional view illustrating a fluid-guiding unit of the fluid system according to the embodiment of the present disclosure. In an embodiment, the fluid-guiding unit 10a is a piezoelectric pump. As shown in FIG. 2A, each fluid-guiding unit 10a includes an inlet plate 17, the substrate 11, a resonance plate 13, an actuating plate 14, a piezoelectric element 15 and an outlet plate 16, which are stacked on each other sequentially. The inlet plate 17 has at least one inlet aperture 170. The resonance plate 13 has a central aperture 130 and a movable part 131. The movable part 131 is a flexible structure formed by a part of the resonance plate 13 that is not attached and fixed on the substrate 11. The central aperture 130 may be formed in the center of the movable part 131. A first chamber 12 is formed in the substrate 11 between the resonance plate 13 and the inlet plate 17. The actuating plate 14 has a hollow suspension structure and includes a suspension part 141, an outer frame part 142 and a plurality of vacant spaces 143. The suspension part 141 of the actuating plate 14 is connected with the outer frame part 142 through a plurality of connecting parts (not shown), so that the suspension part 141 is suspended and elastically supported by the outer frame part 142. The plurality of vacant spaces 143 are defined between the suspension part 141 and the outer frame part 142 for allowing the fluid to flow therethrough. The way of disposition, the types and the numbers of the suspension part 141, the outer frame part 142 and the vacant spaces 143 may be varied according to the practical requirements, but not limited thereto. Preferably but not exclusively, the actuating plate 14 may be made of a metallic film or a polysilicon film. Moreover, a gap g0 formed between the actuating plate 14 and the resonance plate 13 is defined as a second chamber 18. The outlet plate 16 has an outlet aperture 160. A third chamber 19 is formed between the actuating plate 14 and the outlet plate 16.

In some embodiments, the substrate 11 of the fluid-guiding unit 10a further includes a driving circuit (not shown) electrically connected to the positive electrode and the negative electrode of the piezoelectric element 15 so as to provide driving power to the piezoelectric element 15, but not limited thereto. In other embodiments, the driving circuit may be disposed at any position within the fluid-guiding unit 10a. The disposed position of the driving circuit may be varied according to practical requirements.

Figure 2B:
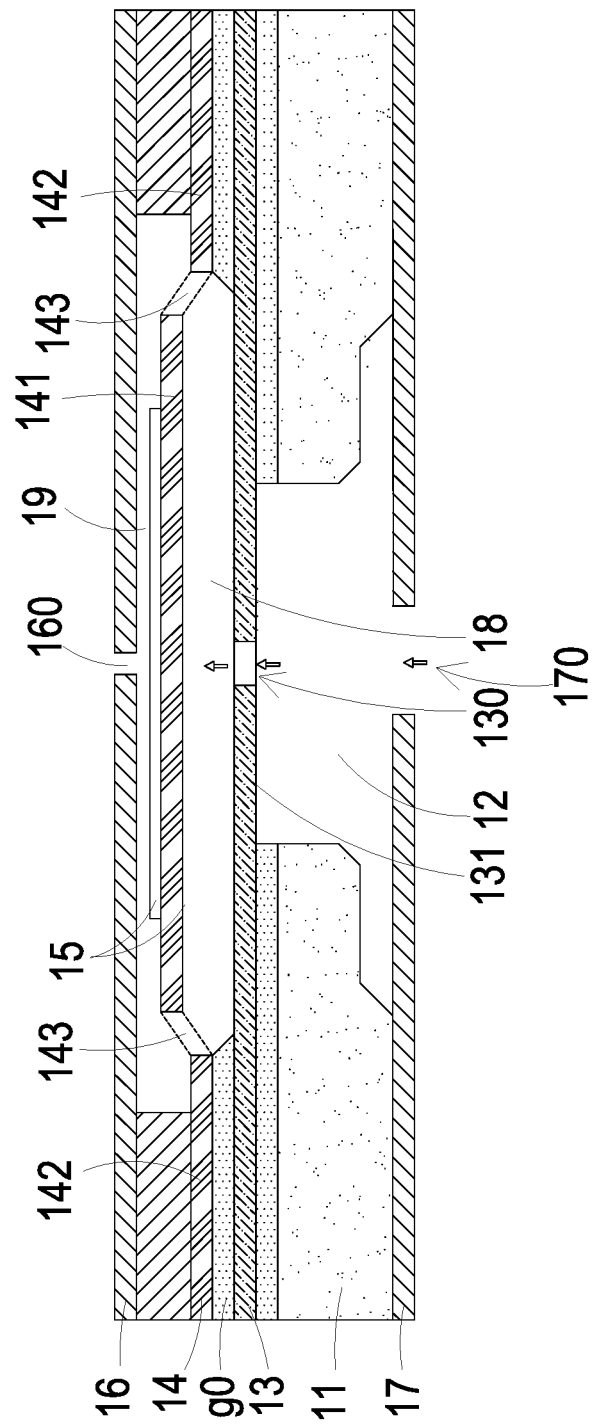
FIGS. 2B, 2C and 2D schematically illustrate the actions of the fluid-guiding unit of the fluid system of FIG. 2A.
Figure 2C:
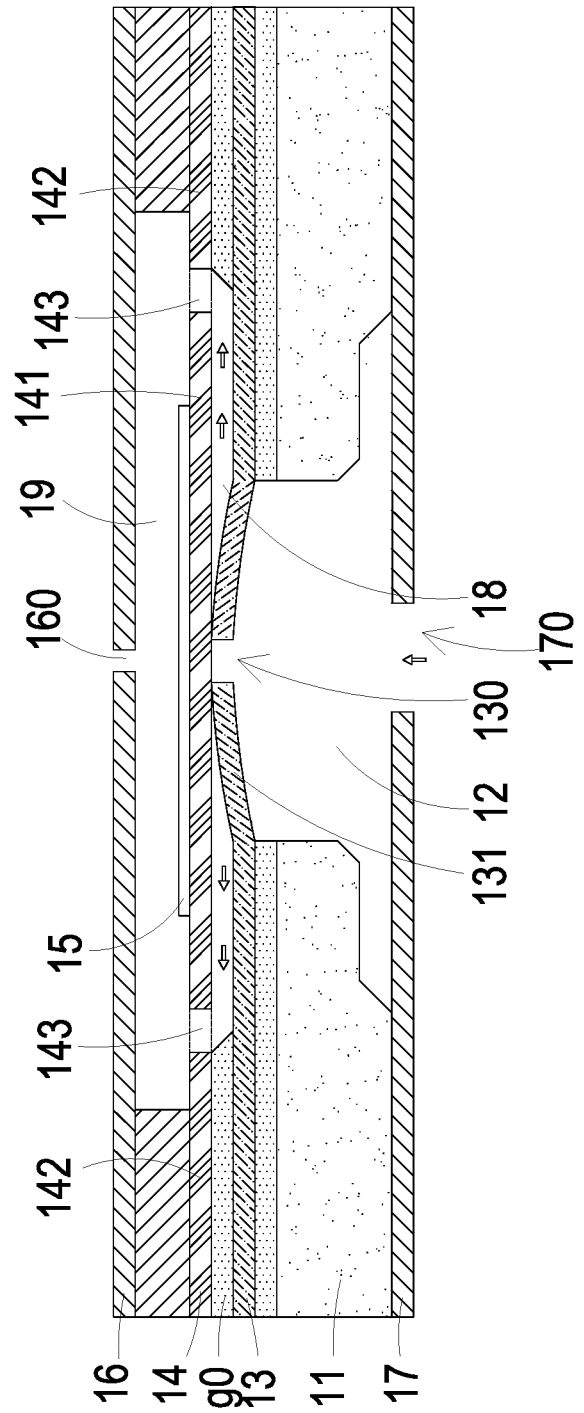
Figure 2D:
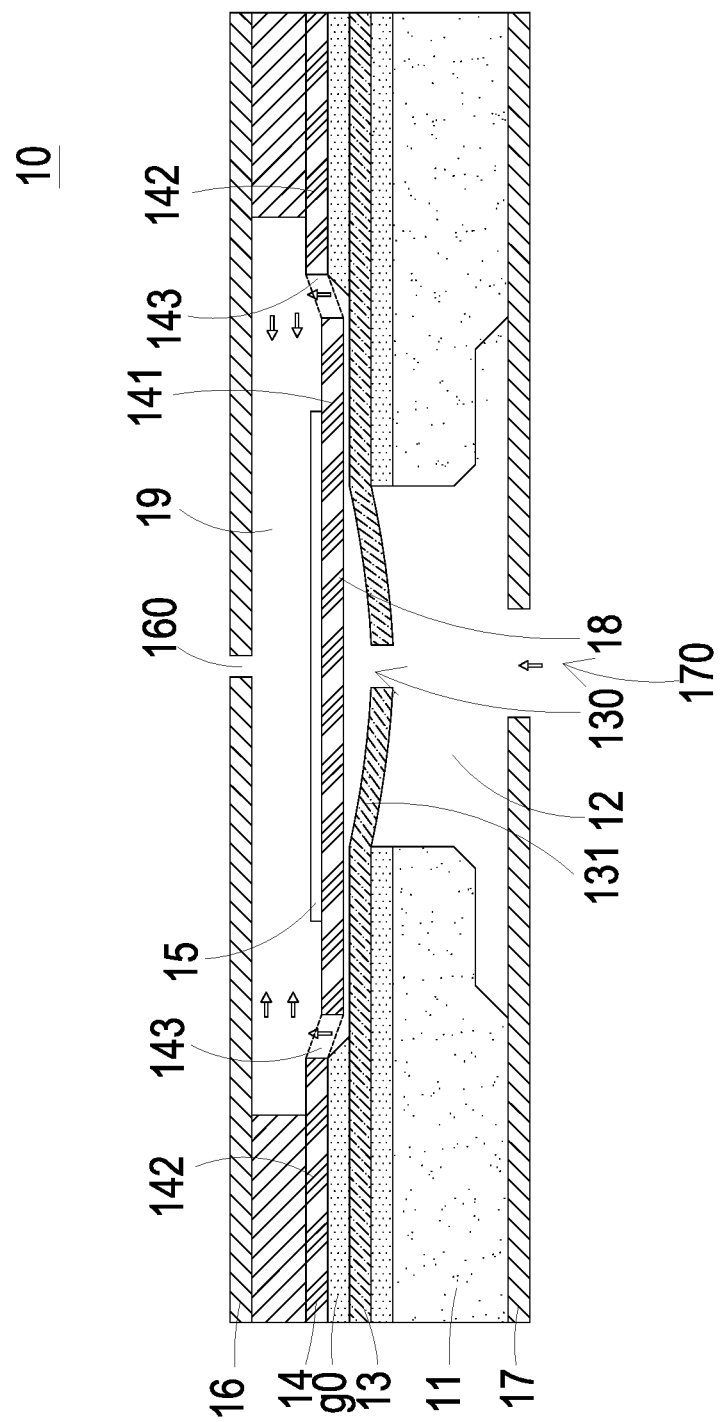

Please refer to FIGS. 2A to 2C. FIGS. 2B, 2C and 2D schematically illustrate the actions of the fluid-guiding unit of the fluid system as in FIG. 2A. As shown in FIG. 2A, the fluid-guiding unit 10a is in a non-enabled state (i.e. in an initial state). When the piezoelectric element 15 is driven in response to an applied voltage, the piezoelectric element 15 undergoes a bending deformation to drive the actuating plate 14 to vibrate along a vertical direction in a reciprocating manner. Please refer to FIG. 2B. As the suspension part 141 of the actuating plate 14 vibrates upwardly (i.e. away from the inlet plate 17), the volume of the second chamber 18 is enlarged and the pressure in the second chamber 18 is reduced. The ambient fluid is inhaled into the fluid-guiding unit 10a through the inlet aperture 170 of the inlet plate 17 in response to the external air pressure, and is then converged into the first chamber 12. Then, the fluid flows into the second chamber 18 from the first chamber 12 through the central aperture 130 of the resonance plate 13, which is spatially corresponding to the first chamber 12.

Please refer to FIG. 2C. The movable part 131 of the resonance plate 13 is driven to vibrate upwardly (i.e. away from the inlet plate 17) in resonance with the vibration of the suspension part 141 of the actuating plate 14, and the suspension part 141 of the actuating plate 14 is vibrating downwardly (i.e. toward the inlet plate 17) at the same time.

In such a manner, the movable part 131 of the resonance plate 13 is attached to and abuts against the suspension part 141 of the actuating plate 14. The communication space between the central aperture 130 of the resonance plate 13 and the second chamber 18 is closed. Consequently, the second chamber 18 is compressed to reduce the volume thereof and increase the pressure therein, and the volume of the third chamber 19 is enlarged and the pressure in the third chamber 19 is reduced. Under this circumstance, the pressure gradient occurs to push the fluid in the second chamber 18 to move toward a peripheral portion of the second chamber 18, and to flow into the third chamber 19 through the vacant spaces 143 of the actuating plate 14. Please refer to FIG. 2D. The suspension part 141 of the actuating plate 14 continues vibrating downwardly (i.e. toward the inlet plate 17) and drives the movable part 131 of the resonance plate 13 to vibrate downwardly (i.e. toward the inlet plate 17) along therewith, so as to further compress the first chamber 18. As a result, most of the fluid in the first chamber 18 is transported into the third chamber 19 and is temporarily stored in the third chamber 19.

Finally, the suspension part 141 of the actuating plate 14 vibrates upwardly (i.e. away from the inlet plate 17) to compress the third chamber 19, thus reducing the volume of the third chamber 19 and increasing the pressure in the third chamber 19. Therefore, the fluid stored in the third chamber 19 is discharged out to the exterior of the outlet plate 16 through the outlet aperture 160 of the outlet plate 16 so as to accomplish a fluid transportation process. The above actions and steps illustrated in FIGS. 2B, 2C and 2D indicate a complete cycle of the reciprocating vibration of the actuating plate 14. The suspension part 141 of the actuating plate 14 and the movable part 131 of the resonance plate 13 perform the above actions repeatedly under the condition of that the piezoelectric element 15 is enabled. Consequently, the fluid is continuously inhaled into the inlet aperture 170 to be pressurized and discharged out through the outlet aperture 160. In such way, the purpose of fluid transportation is achieved. In some embodiments, the vibration frequency of the resonance plate 13 along the vertical direction in the reciprocating manner may be identical to the vibration frequency of the actuating plate 14. That is, the resonance plate 13 and the actuating plate 14 synchronously vibrate along the upward direction or the downward direction. It should be noted that numerous modifications and alterations of the actions of the fluid-guiding unit 10a may be made while retaining the teachings of the disclosure.

In this embodiment, the fluid-guiding unit 10a can generate a pressure gradient in the designed fluid channels of itself to facilitate the fluid to flow at a high speed. Since there is an impedance difference between the inlet direction and the outlet direction, the fluid can be transported from an inhale end to a discharge end of the fluid-guiding unit 10a. Moreover, even if a gas pressure exists at the discharge end, the fluid-guiding unit 10a still has the capability to discharge out the fluid while achieving the silent efficacy.

Figure 3A:
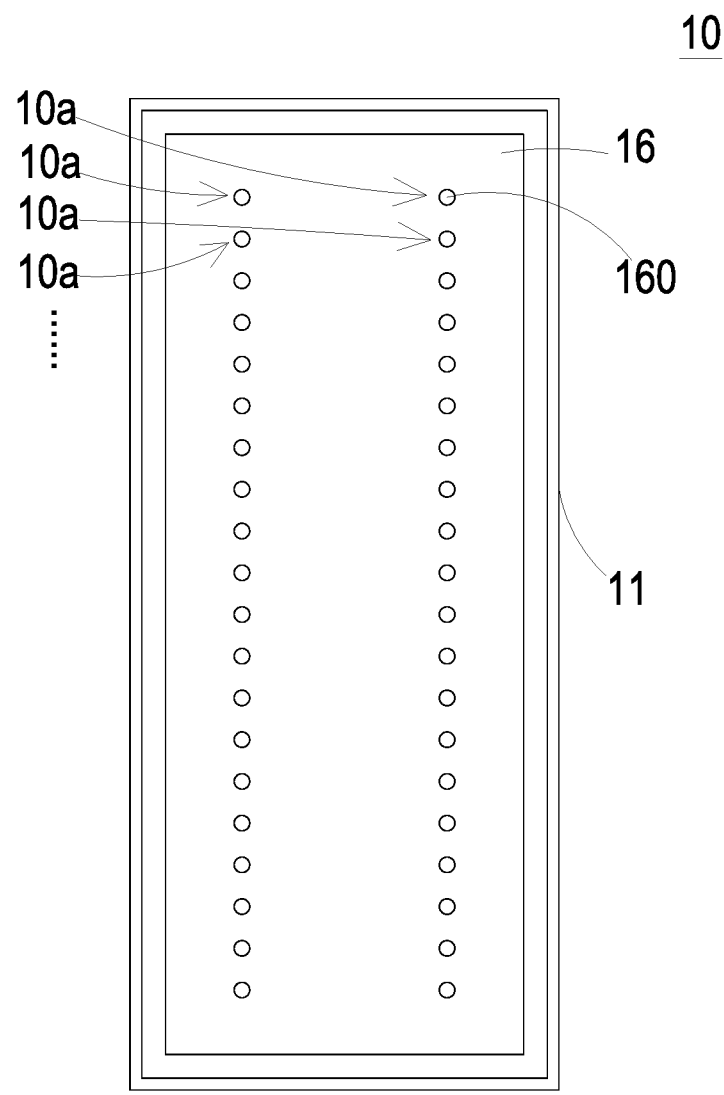
FIG. 3A schematically illustrates the fluid active region of the fluid system as shown in FIG. 1.

Referring to FIG. 3A, which schematically illustrates the fluid active region of the fluid system as shown in FIG. 1, the fluid active region 10 includes a plurality of fluid-guiding units 10a. The amount of the fluid to be discharged from the fluid active region 10 is adjusted according to the arrangement of the fluid-guiding units 10a. In this embodiment, the plurality of fluid-guiding units 10a are disposed on the substrate 11 and connected with each other in a serial and parallel arrangement.

Figure 3B:
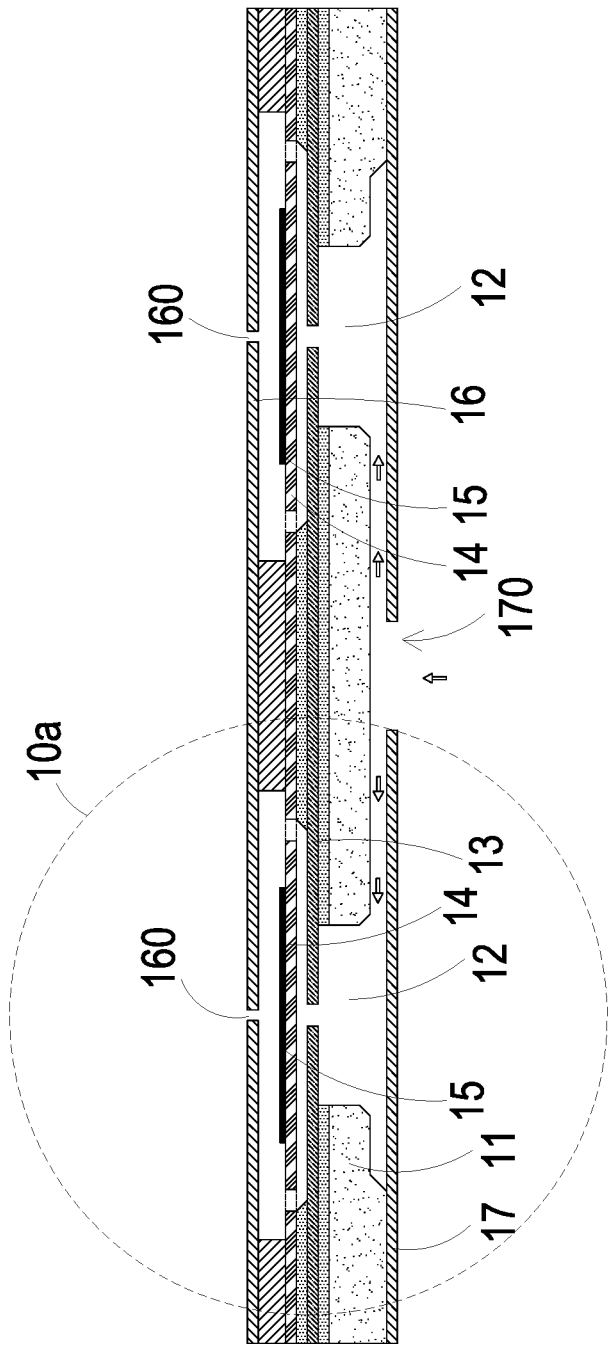
FIG. 3B schematically illustrates a portion of the fluid active region of the fluid system, in which the fluid-guiding units are connected with each other in a serial arrangement.
Figure 3C:
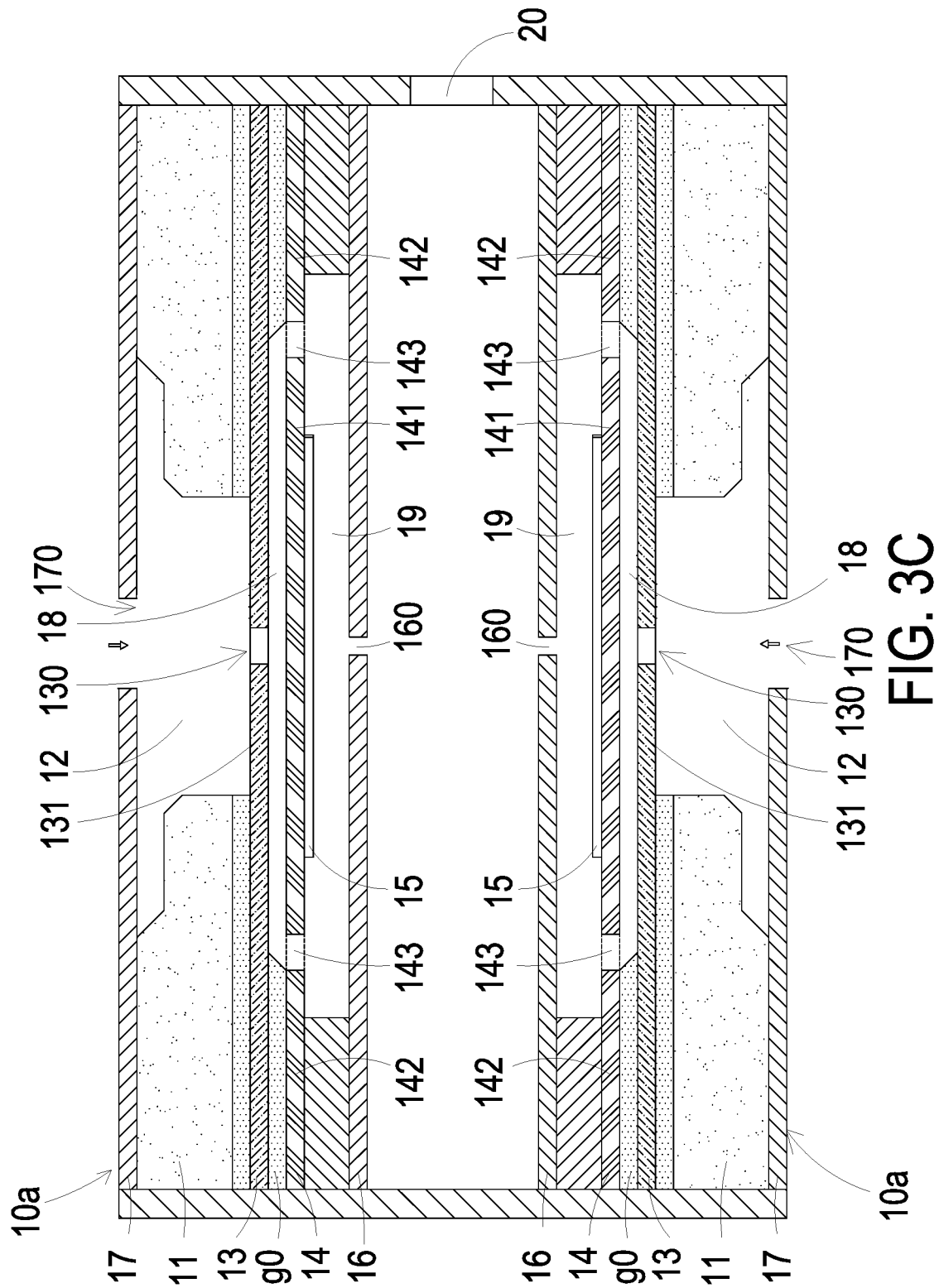
FIG. 3C schematically illustrates a portion of the fluid active region of the fluid system, in which the fluid-guiding units are connected with each other in a parallel arrangement.
Figure 3D:
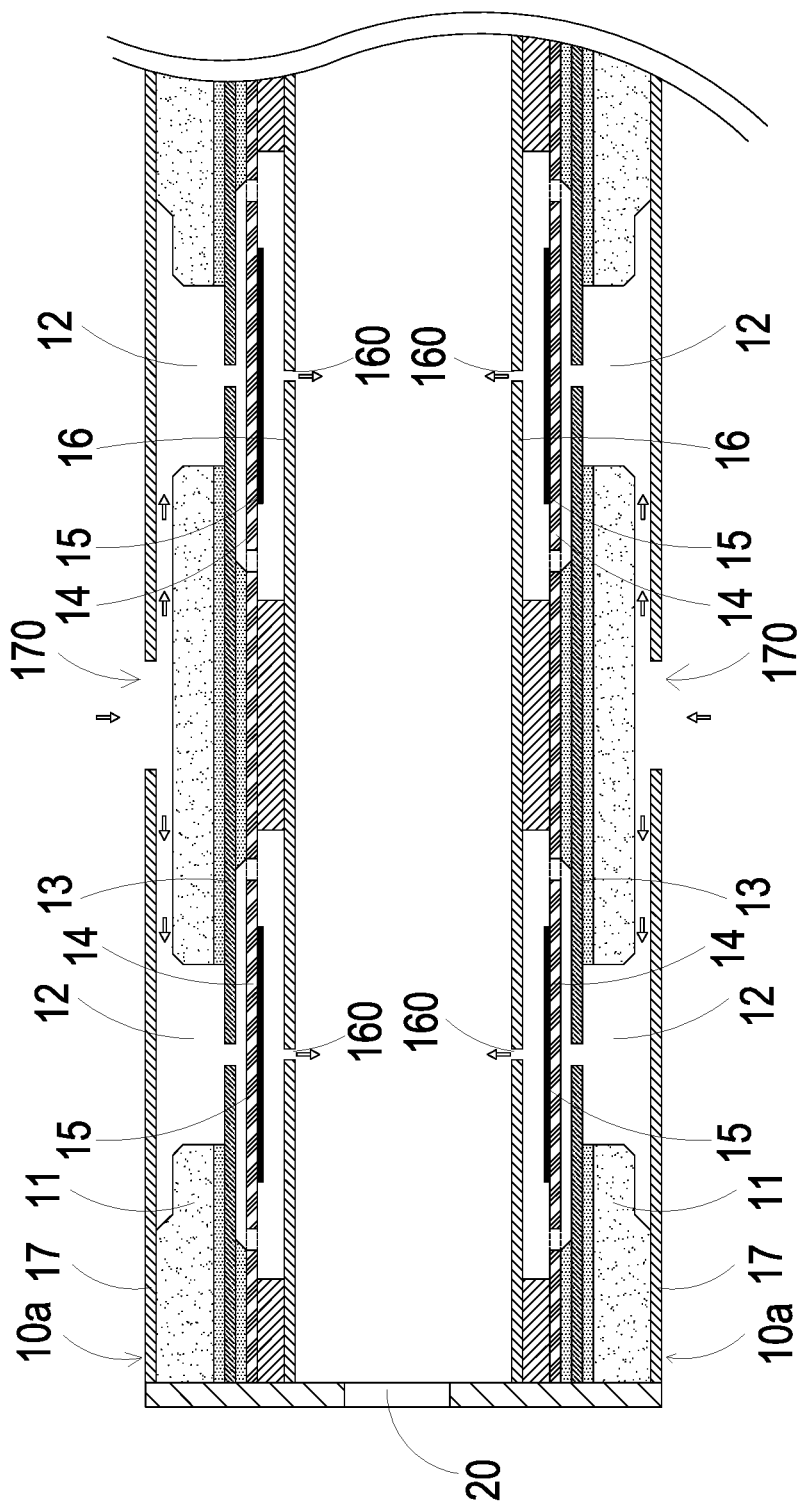
FIG. 3D schematically illustrates a portion of the fluid active region of the fluid system, in which the fluid-guiding units are connected with each other in a serial and parallel arrangement.

Please refer to FIGS. 3B, 3C and 3D. FIG. 3B schematically illustrates a portion of the fluid active region of the fluid system, in which the fluid-guiding units are connected with each other in a serial arrangement. FIG. 3C schematically illustrates a portion of the fluid active region of the fluid system, in which the fluid-guiding units are connected with each other in a parallel arrangement. FIG. 3D schematically illustrates a portion of the fluid active region of the fluid system, in which the fluid-guiding units are connected with each other in a serial and parallel arrangement. As shown in FIG. 3B, the fluid-guiding units 10a of the fluid active region 10 are connected with each other in a serial arrangement. Since the fluid-guiding units 10a are connected with each other in series, the pressure of the fluid at the outlet apertures 160 of the fluid active region 10 is increased. As shown in FIG. 3C, the fluid-guiding units 10a of the fluid active region 10 are connected with each other in a parallel arrangement. Since the fluid-guiding units 10a are connected with each other in parallel, the amount of the fluid to be discharged out from the outlet apertures 160 of the fluid active region 10 is increased. As shown in FIG. 3D, the fluid-guiding units 10a of the fluid active region 10 are connected with each other in a serial and parallel arrangement. Consequently, the pressure of the fluid and the amount of the fluid to be discharged out from the fluid active region 10 are both increased.

Figure 4:
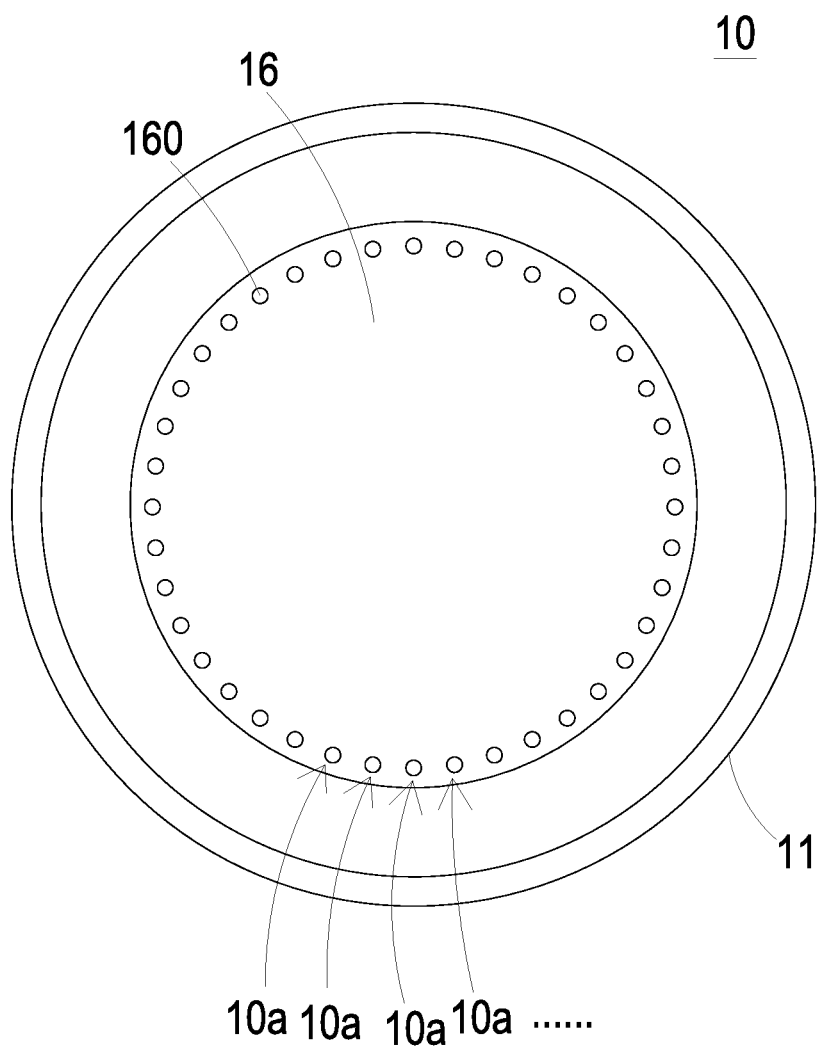
FIG. 4 schematically illustrates the fluid active region of the fluid system according to another embodiment of the present disclosure.
Figure 5:
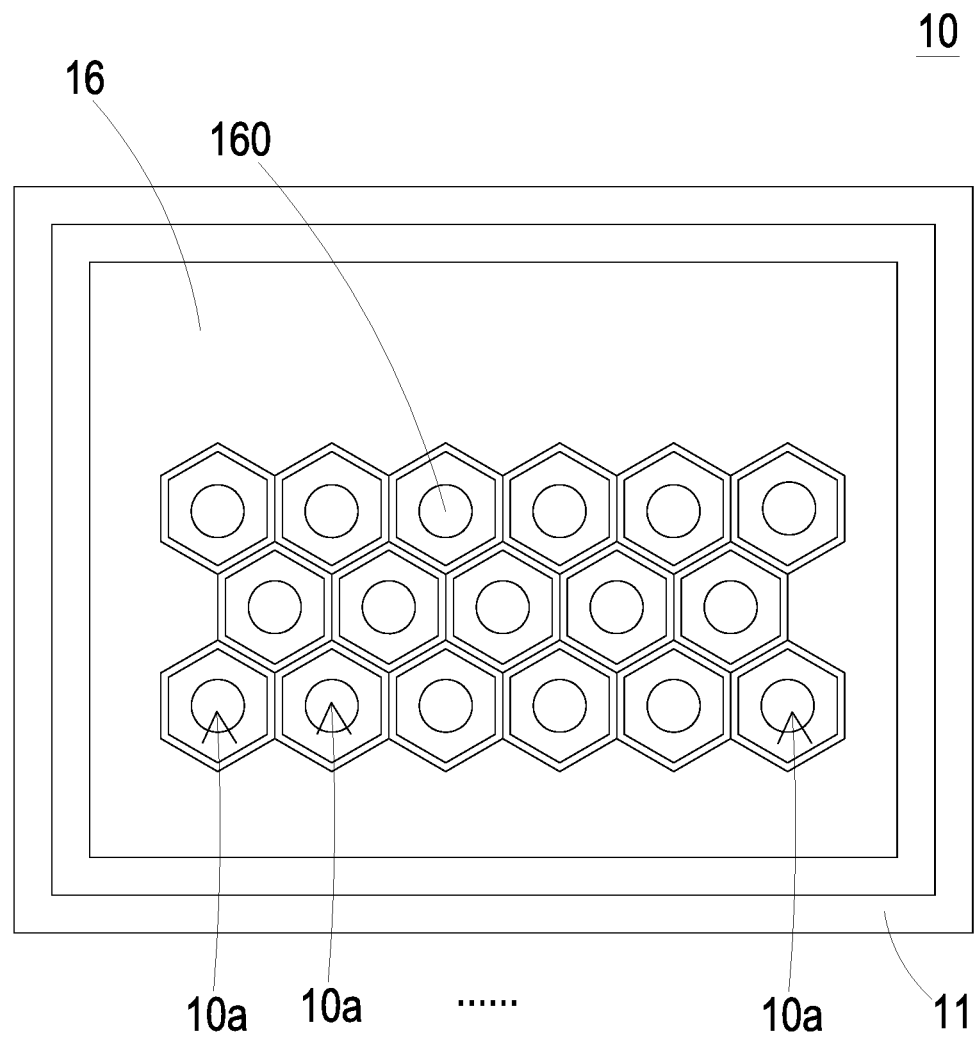
FIG. 5 schematically illustrates the fluid active region of the fluid system according to further another embodiment of the present disclosure.

Please refer to FIGS. 4 and 5. FIG. 4 schematically illustrates the fluid active region of the fluid system according to another embodiment of the present disclosure. FIG. 5 schematically illustrates the fluid active region of the fluid system according to further another embodiment of the present disclosure. According to the embodiment shown in FIG. 4, the fluid-guiding units 10a of the fluid active region 10 are connected with each other in a ring-shaped arrangement so as to transport the fluid. According to the embodiment shown in FIG. 5, the fluid-guiding units 10a of the fluid active region 10 are connected with each other in a honeycomb arrangement.

It can be seen from the above description that the fluid-guiding units 10a of the fluid system 100 have high flexibility in assembling arrangement as long as being connected with the driving circuit, which make them suitably applied to various electronic components. Moreover, the fluid-guiding units 10a of fluid system 100 may be enabled to transport fluid simultaneously so as to transport a great amount of fluid according to the practical requirements. Moreover, two fluid-guiding units 10a may be individually controlled to be enabled or disabled. For example, one fluid-guiding unit 10a is enabled, and the other fluid-guiding unit 10a is disabled. Another example is that the two fluid-guiding units 10a are alternately enabled, but not limited thereto. Consequently, the purpose of transporting various amount of the fluid and the purpose of reducing the power consumption can be achieved.

FIGS. 6A and 6B are schematic cross-sectional views illustrating the actions of the valve used in the fluid system according to a first aspect of the present disclosure. According to the first aspect of the present disclosure, the valve 50 includes a base 51, a piezoelectric actuator 52 and a linking bar 53. The valve 50 is exemplified as being disposed in the sub-branch channel 21a. The structures and actions of the valves 50 disposed in the other sub-branch channels 22a, 21b and 22b are similar to the structure and the actions of the valve 50 disposed in the sub-branch channel 21a, and are not redundantly described herein. The base 51 includes a first passage 511 and a second passage 512, which are in communication with the sub-branch channel 21a and are separated from each other by a partial structure of the base 51. A cavity 513 is concavely formed on the top surface of the base 51. The cavity 513 has a first outlet 514 and a second outlet 515. The first outlet 514 is in communication with the first passage 511, and the second outlet 515 is in communication with the second passage 512. The piezoelectric actuator 52 includes a carrier plate 521 and a piezoelectric ceramic plate 522. The carrier plate 521 may be made of a flexible material. The piezoelectric ceramic plate 522 is attached on a first surface of the carrier plate 521 and electrically connected to the controller 60 (Referring to FIG. 1). The carrier plate 521 of the piezoelectric actuator 52 is disposed on the cavity 513 to cover the cavity 513, so that the cavity 513 is closed. A first end of the linking bar 53 is connected with a second surface of the carrier plate 521, and the linking bar 53 is inserted into the second outlet 515 and is movable within the second outlet 515 along a vertical direction. A second end of the linking bar 53 is formed as a stopping part 531 to be used to close the second outlet 515. The cross section area of the stopping part 531 has a diameter larger than the diameter of the second outlet 515. Preferably but not exclusively, the stopping part 531 may be a flat plate structure or a mushroom-shaped structure.

Please refer to FIG. 6A. When the piezoelectric actuator 52 of the valve 50 is not enabled, the linking bar 53 is in an initial position and in a normally open state. Meanwhile, a communication space is formed between the stopping part 531 and the second outlet 515 for allowing the second passage 512, the cavity 513 and the first passage 511 to be in fluid communication with each other and in fluid communication with the sub-branch channel 21a, so that the fluid is allowed to flow therethrough. On the contrary, referring to FIG. 6B, when the piezoelectric actuator 52 is enabled, the carrier plate 521 is driven to undergo upward bending deformation by the piezoelectric ceramic plate 522, so that the linking bar 53 is driven to move upwardly by the carrier plate 521. Consequently, the second outlet 515 is closed by being covered by the stopping part 531, and the fluid cannot be transported through the second outlet 515. In such way, the valve 50 makes the sub-branch channel 21a in the open state when the valve 50 is non-enabled, and the valve 50 makes the sub-branch channel 21a in the closed state when the valve 50 is enabled. In other words, the fluid is selectively transported through the branch channel 21a, which is controlled by a fluid communication state of the second passage 512 of the valve 50.

FIGS. 7A and 7B are schematic cross-sectional views illustrating the actions of the valve used in the fluid system according to a second aspect of the present disclosure. According to the second aspect of the present disclosure, the structure of the valve 50 is similar to that of FIGS. 6A and 6B. In contrast, the valve 50 is in a normally closed state when the valve 50 is not enabled.

Please refer to FIG. 7A. When the piezoelectric actuator 52 of the valve 50 is not enabled, the linking bar 53 is in an initial position and in a normally closed state. Meanwhile, the second outlet 515 is closed by being covered by the stopping part 531, and the fluid cannot be transported through the second outlet 515. Please refer to FIG. 7B. When the piezoelectric actuator 52 is enabled, the carrier plate 521 is driven to undergo downward bending deformation by the piezoelectric ceramic plate 522, so that the linking bar 53 is driven to move downwardly by the carrier plate 521. Under this circumstance, a communication space is formed between the stopping part 531 and the second outlet 515 for allowing the second passage 512, the cavity 513 and the first passage 511 to be in fluid communication with each other and in fluid communication with the sub-branch channel 21a, so that the fluid is allowed to flow therethrough. In such way, the valve 50 makes the sub-branch channel 21a in the closed state when the valve 50 is non-enabled, and the valve 50 makes the sub-branch channel 21a in the open state when the valve 50 is enabled. In other words, the fluid is selectively transported through the branch channel 21a, which is controlled by a fluid communication state of the second passage 512 of the valve 50.

From the above descriptions, the present disclosure provides the fluid system using the at least one fluid-guiding unit for transporting the fluid to the convergence chamber. The valves disposed in the branch channels are used to control and adjust the amount, flow rate and pressure of the fluid to be discharged from the fluid system. The numbers, arrangements and driving methods of the at least one fluid-guiding unit and the branch channels may be flexibly varied according to the practical requirements. In other words, the fluid system of the present disclosure can provide the efficacy of transporting a great amount of fluid in a high performance and high flexible manner according to various applied devices and required amount of fluid to be transported. Furthermore, the sensors disposed in the branch channels are used to obtain information about the air or the fluid flowing through the branch channels. The fluid system of the present disclosure is produced by an integrated process to minimize and achieve a miniature fluid system. It benefits to flexibly control the flow rate and the pressure of the fluid, and simultaneously detect the fluid and the air to obtain information thereof.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fluid system produced by an integrated process, comprising:
   a fluid active region comprising at least one fluid-guiding unit, wherein the at least one fluid-guiding unit is configured to transport fluid to flow and discharge the fluid through at least one outlet aperture;
   a fluid channel in communication with the at least one outlet aperture of the fluid active region, and comprising a plurality of branch channels, wherein the fluid discharged from the fluid active region is split by the branch channels, so that a required amount of the fluid to be transported is achieved;
   a convergence chamber in communication with the fluid channel for allowing the fluid to be accumulated therein;
   a plurality of valves, each of which is disposed in the corresponding branch channel, wherein the fluid is discharged out through the corresponding branch channel according to an open/closed state of the valve disposed therein; and
   a plurality of sensors, each of which is disposed in the corresponding branch channel which is in communication between the fluid active region and the convergence chamber, and configured to measure a specific detecting content in the fluid,
   wherein each of the at least one fluid-guiding unit is a piezoelectric pump including an inlet plate, a substrate, a resonance plate, an actuating plate, a piezoelectric element and an outlet plate, which are stacked on each other sequentially, wherein the fluid active region, the fluid channel, the convergence chamber, the plurality of sensors and the plurality of valves are packaged in a system-in-package manner on the substrate to form an integrated structure.

2. The fluid system according to claim 1, wherein the at least one fluid-guiding unit of the fluid active region comprises a plurality of fluid-guiding units, and the plurality of fluid-guiding units are connected with each other in a serial arrangement to transport the fluid.

3. The fluid system according to claim 1, wherein the at least one fluid-guiding unit of the fluid active region comprises a plurality of fluid-guiding units, and the plurality of fluid-guiding units are connected with each other in a parallel arrangement to transport the fluid.

4. The fluid system according to claim 1, wherein the at least one fluid-guiding unit of the fluid active region comprises a plurality of fluid-guiding units, and the plurality of fluid-guiding units are connected with each other in a serial and parallel arrangement to transport the fluid.

5. The fluid system according to claim 1, wherein the at least one fluid-guiding unit of the fluid active region comprises a plurality of fluid-guiding units, and the plurality of fluid-guiding units are connected with each other in a ring-shaped arrangement to transport the fluid.

6. The fluid system according to claim 1, wherein the at least one fluid-guiding unit of the fluid active region comprises a plurality of fluid-guiding units, and the plurality of fluid-guiding units are connected with each other in a honeycomb arrangement to transport the fluid.

7. The fluid system according to claim 1, wherein the lengths of the plurality of branch channels are preset according to the required amount of the fluid to be transported.

8. The fluid system according to claim 1, wherein the widths of the plurality of branch channels are preset according to the required amount of the fluid to be transported.

9. The fluid system according to claim 1, wherein the plurality of valves are a plurality of active valves.

10. The fluid system according to claim 9, wherein the open/closed states of the plurality of active valves are controlled by a controller.

11. The fluid system according to claim 9, wherein the plurality of valves are a plurality of passive valves.

12. The fluid system according to claim 1, wherein the plurality of branch channels are connected with each other in a serial arrangement.

13. The fluid system according to claim 1, wherein the plurality of branch channels are connected with each other in a parallel arrangement.

14. The fluid system according to claim 1, wherein the plurality of branch channels are connected with each other in a serial and parallel arrangement.

15. The fluid system according to claim 1, wherein the plurality of sensors comprise at least one selected from the group consisting of a gas sensor, a liquid sensor, an ozone sensor, a suspended particle sensor, a volatile organic compound sensor, a light sensor and combinations thereof.

16. The fluid system according to claim 1, wherein the plurality of sensors comprise at least one selected from the group consisting of an oxygen sensor, a carbon monoxide sensor, a carbon dioxide sensor and combinations thereof.

17. The fluid system according to claim 1, wherein the plurality of sensors comprise at least one selected from the group consisting of a thermometer, a hygrometer and a combination thereof.

18. A fluid system produced by an integrated process, comprising:

at least one fluid active region comprising at least one fluid-guiding unit, wherein the at least one fluid-guiding unit is configured to transport fluid to flow and discharge the fluid through at least one outlet aperture;

at least one fluid channel in communication with the at least one outlet aperture of the fluid active region, and comprising a plurality of branch channels, wherein the fluid discharged from the fluid active region is split by the branch channels, so that a required amount of the fluid to be transported is achieved;

at least one convergence chamber in communication with the fluid channel for allowing the fluid to be accumulated therein;

a plurality of valves, each of which is disposed in the corresponding branch channel, wherein the fluid is discharged out through the corresponding branch channel according to an open/closed state of the valve disposed therein; and a plurality of sensors, each of which is disposed in the corresponding branch channel which is in communication between the fluid active region and the convergence chamber, and configured to measure at least one specific detecting content in the fluid, wherein each of the at least one fluid-guiding unit is a piezoelectric pump including an inlet plate, a substrate, a resonance plate, an actuating plate, a piezoelectric element and an outlet plate, which are stacked on each other sequentially, wherein the at least one fluid active region, the at least one fluid channel, the at least one convergence chamber, the plurality of sensors and the plurality of valves are packaged in a system-in-package manner on the substrate to form an integrated structure.

* * * * *